United States Patent
Ausman et al.

(10) Patent No.: US 8,346,409 B2
(45) Date of Patent: Jan. 1, 2013

(54) VARIABLE SPEED FLAP RETRACTION AND NOTIFICATION

(75) Inventors: Marc Ausman, Albuquerque, NM (US); Kevin DeVries, Albuquerque, NM (US); Jake Dostal, Albuquerque, NM (US)

(73) Assignee: Vertical Power, Inc., Albuquerque, NM (US)

(*) Notice: Subject to any disclaimer, the term of this patent is extended or adjusted under 35 U.S.C. 154(b) by 1120 days.

(21) Appl. No.: 11/875,819

(22) Filed: Oct. 19, 2007

(65) Prior Publication Data

US 2009/0302174 A1 Dec. 10, 2009

Related U.S. Application Data

(63) Continuation-in-part of application No. 11/311,060, filed on Dec. 19, 2005.

(60) Provisional application No. 60/853,712, filed on Oct. 23, 2006.

(51) Int. Cl.
*B64C 13/02* (2006.01)
*B64C 13/10* (2006.01)
*B64C 13/04* (2006.01)
*G06F 17/00* (2006.01)
*G05D 1/00* (2006.01)

(52) U.S. Cl. ............ 701/11; 701/14; 340/945; 340/963; 244/76 R; 244/178

(58) Field of Classification Search .................. 701/1, 3, 701/4, 5, 8–11, 14–16; 340/945, 963, 964; 244/75.1, 76 R, 175, 177, 178, 179
See application file for complete search history.

(56) References Cited

U.S. PATENT DOCUMENTS

| | | | |
|---|---|---|---|
| 4,127,847 A | 11/1978 | Stifter |
| 4,191,347 A | 3/1980 | Fueyo |
| 4,243,970 A | 1/1981 | Hardee et al. |
| 4,409,635 A | 10/1983 | Kraus |
| 4,452,207 A | 6/1984 | Moore, Jr. |
| 4,598,890 A | 7/1986 | Herzog et al. |
| 4,649,484 A | 3/1987 | Herzog et al. |
| 4,729,102 A | 3/1988 | Miller |
| 5,001,638 A | 3/1991 | Zimmerman |
| 5,082,208 A | 1/1992 | Matich |
| 5,353,657 A | 10/1994 | Bainbridge, III |
| 5,497,072 A | 3/1996 | LeComte et al. |
| 5,723,915 A | 3/1998 | Maher et al. |
| 5,864,221 A | 1/1999 | Downs et al. |
| 5,913,492 A | 6/1999 | Durandeau et al. |
| 5,941,222 A | 8/1999 | Braly |
| 6,325,333 B1 | 12/2001 | Najmabadi et al. |
| 6,346,892 B1 | 2/2002 | DeMers et al. |
| 6,556,902 B2 | 4/2003 | Ing et al. |
| 6,639,522 B2 | 10/2003 | Derderian |
| 6,664,945 B1 | 12/2003 | Gyde et al. |

(Continued)

OTHER PUBLICATIONS web pages at http://www.tcwtech.com/, (visited on Jan. 26, 2008 and Jan. 27, 2008).

*Primary Examiner* — Thomas Tarcza
*Assistant Examiner* — Edward Pipala
(74) *Attorney, Agent, or Firm* — V. Gerald Grafe

(57) ABSTRACT

The present invention provides systems and methods for controlling the speed of flap retraction on aircraft, and alerts to the pilot of potentially unsafe flap position. The invention accepts direction from a pilot and senses operation of the aircraft to determine appropriate flap position and flap retraction speed.

14 Claims, 3 Drawing Sheets

U.S. PATENT DOCUMENTS

| | | |
|---|---|---|
| 6,700,482 B2 | 3/2004 | Ververs et al. |
| 6,754,567 B2 | 6/2004 | Bernard |
| 6,824,099 B1 | 11/2004 | Jones |
| 6,842,672 B1 | 1/2005 | Straub et al. |
| 6,859,688 B1 | 2/2005 | Orf et al. |
| 7,021,587 B1 | 4/2006 | Younkin |
| 7,039,518 B2 | 5/2006 | Ingram et al. |
| 2002/0035415 A1 | 3/2002 | Gardner |
| 2002/0035416 A1 | 3/2002 | De Leon |
| 2003/0048203 A1 | 3/2003 | Clary |
| 2005/0187677 A1 | 8/2005 | Walker |
| 2010/0076630 A1 | 3/2010 | Vian |

VARIABLE SPEED FLAP RETRACTION AND NOTIFICATION

CROSS-REFERENCE TO RELATED APPLICATIONS

This application claims the benefit of U.S. provisional application 60/853,712, filed Oct. 23, 2006, which is incorporated herein by reference. This application claims the benefit as a continuation-in-part of U.S. patent application Ser. No. 11/311,060, filed Dec. 19, 2005, which is incorporated herein by reference.

This application is related to the following applications, each of which is incorporated herein by reference:

Aircraft Emergency Handling, U.S. patent application Ser. No. 11/875,813, filed on the same date hereof;

Backup Electrical Power System for Solid-State Aircraft Power Distribution Systems, U.S. patent application Ser. No. 11/875,815, filed on the same date hereof;

Aircraft Electrical System Evaluation, U.S. patent application Ser. No. 11/875,816, filed on the same date hereof;

Aircraft Exhaust Gas Temperature Monitor, U.S. patent application Ser. No. 11/875,818, filed on the same date hereof.

FIELD OF THE INVENTION

This invention relates to the field of aircraft control, and more specifically to systems that provide for automated control of aircraft flaps dependent on operating parameters of the aircraft.

BACKGROUND

Flap control and drive systems for aircraft are known in the art. On certain aircraft, for example, the flaps can be controlled by activating a lever or switch which energizes a drive motor to drive the flaps to the selected position. In such systems, the pilot can visually check the condition of the flaps and if the selected position is intermediate between a full-up or a full-down flap position, the pilot can deactivate the lever or switch at an proper intermediate position.

Flap control circuitry permits the pilot to select the position of the flaps by moving the lever to a point corresponding to the desired position of the flaps. The flap control circuitry will energize a motor, which can be mechanically connected through flexible drive couplings, to drive the flaps to the desired position and then cause the motor to be de-energized. The pilot can rely on the control circuitry to drive the flaps to the proper position, and once the pilot has selected the proper flap position, he can devote his attention to flying the aircraft.

However, flaps controlled in this manner raise and lower at the same speed regardless of conditions. During a missed approach or a go-around, pilots apply full engine power, usually with the flaps in the full down position. Correct procedure is to manually raise the flaps in steps so that the lift characteristics of the wing do not change too rapidly. However, this is additional workload for the pilot during a busy and critical time. Accordingly, there is a need for flap control methods and apparatuses that accept high level flap control input from a pilot and determine aircraft operating conditions to apply proper flap control.

Other patents of interest relative to this disclosure include the following, each of which is incorporated herein by reference: U.S. Pat. No. 6,824,099 "Brake systems for aircraft wing flaps and other control surfaces"; U.S. Pat. No. 5,082,208 "System and method for controlling an aircraft flight control member"; U.S. Pat. No. 4,191,347 "Flap control circuitry".

SUMMARY OF THE INVENTION

The present invention provides methods for automatically determining whether to raise the flaps slowly with a single actuation of the flap switch under full engine power. It can also give the pilot an alert (e.g., audible, visual, or both) if the flaps are not retracted while full engine power is applied. The methods can function within a system that has engine data inputs, flap up and down command inputs, has control ability to move flaps up and down, has the ability to monitor flap position, and has the ability to provide alerts to the pilot. The flap up and down commands can be provided by a switch with momentary up and down positions, and a neutral/off middle position.

Example embodiments of the present invention provide a flap motor controller system', adapted to move an aircraft's flaps; a flap position sensor; an engine power sensor; and a controller, adapted to use the flap motor controller to move the aircraft's flaps in response to direction from a pilot, where the flaps are moved at a rate that is determined in part from the engine power.

DETAILED DESCRIPTION OF THE INVENTION

Figure 1:
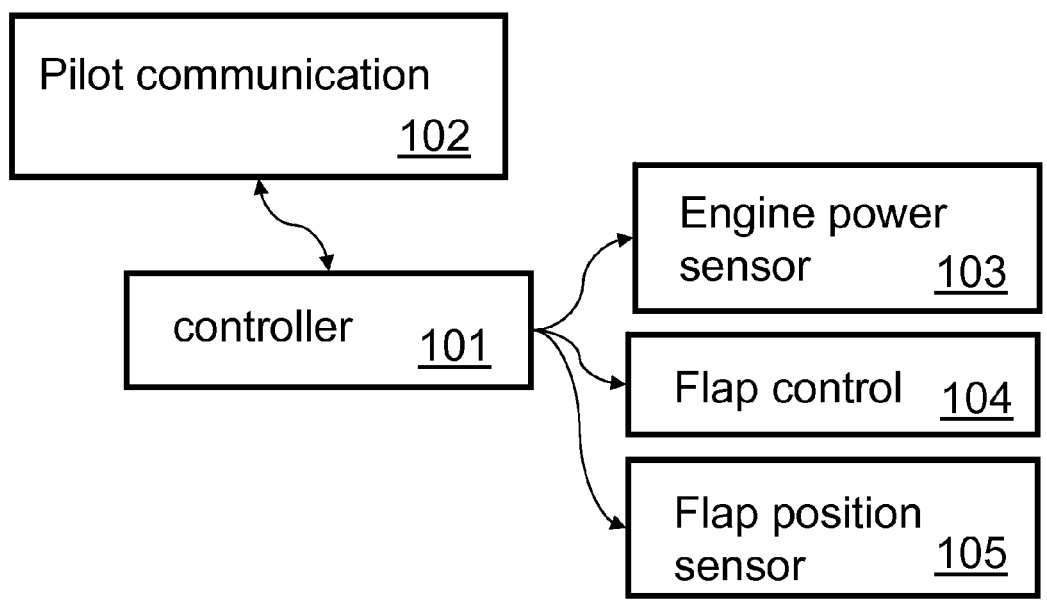
FIG. 1 is a schematic illustration of an example embodiment of the present invention.

FIG. 1 is a schematic illustration of an example embodiment of the present invention. The aircraft's flaps are controlled by a flap motor controller 104 such as those known in the art and interfaced with a controller. The position of the aircraft's flaps can be sensed by flap position sensors 105, which in some embodiments can be integrated with the flap motor controller. An engine power sensor 103 senses the output power of the engine, for example by sensing RPM of a piston engine or N1% of a turbine engine. A controller 101 accepts input from the flap position sensors 105 and the engine power sensor 103, and from a pilot input system 102, and provides control signals to the flap motor controller 104. The pilot input system 102 can comprise a voice recognition facility, programmable (or "soft") buttons such as can be implemented with a touch sensitive display, or a manual switch such as a switch with "up" and "down" momentary contacts and a rest position where neither the "up" or "down" contacts are active.

In operation, the pilot can direct the controller 101 to adjust the position of the flaps, e.g., "flaps up" or "flaps down", by speaking a recognizable command, pressing a soft button, or momentarily moving a manual switch to the appropriate position. The controller 101 can determine an appropriate flap motion profile from the pilot direction and from the engine power sensor 103. For example, if the pilot directs "flaps up" and the engine power is above a threshold, then the controller can determine that high speed flap movement is not desirable. In such a circumstance, the controller 101 can issue signals to the flap motor controllers 104 to move the flaps at a slow rate, or in increments (rather than in one continuous motion), or a combination thereof. The controller 101 can accept direction from the pilot to stop the flap motion, for example by a voice command or by momentarily moving a manual switch to the appropriate position (e.g., pushing a switch to "flaps down" while the flaps are moving up can cancel a previous "flaps up" direction). The controller 101 can also stop the flaps motion when the flaps reach a terminal position, as indicated by the flap position sensors 105.

Figure 2:
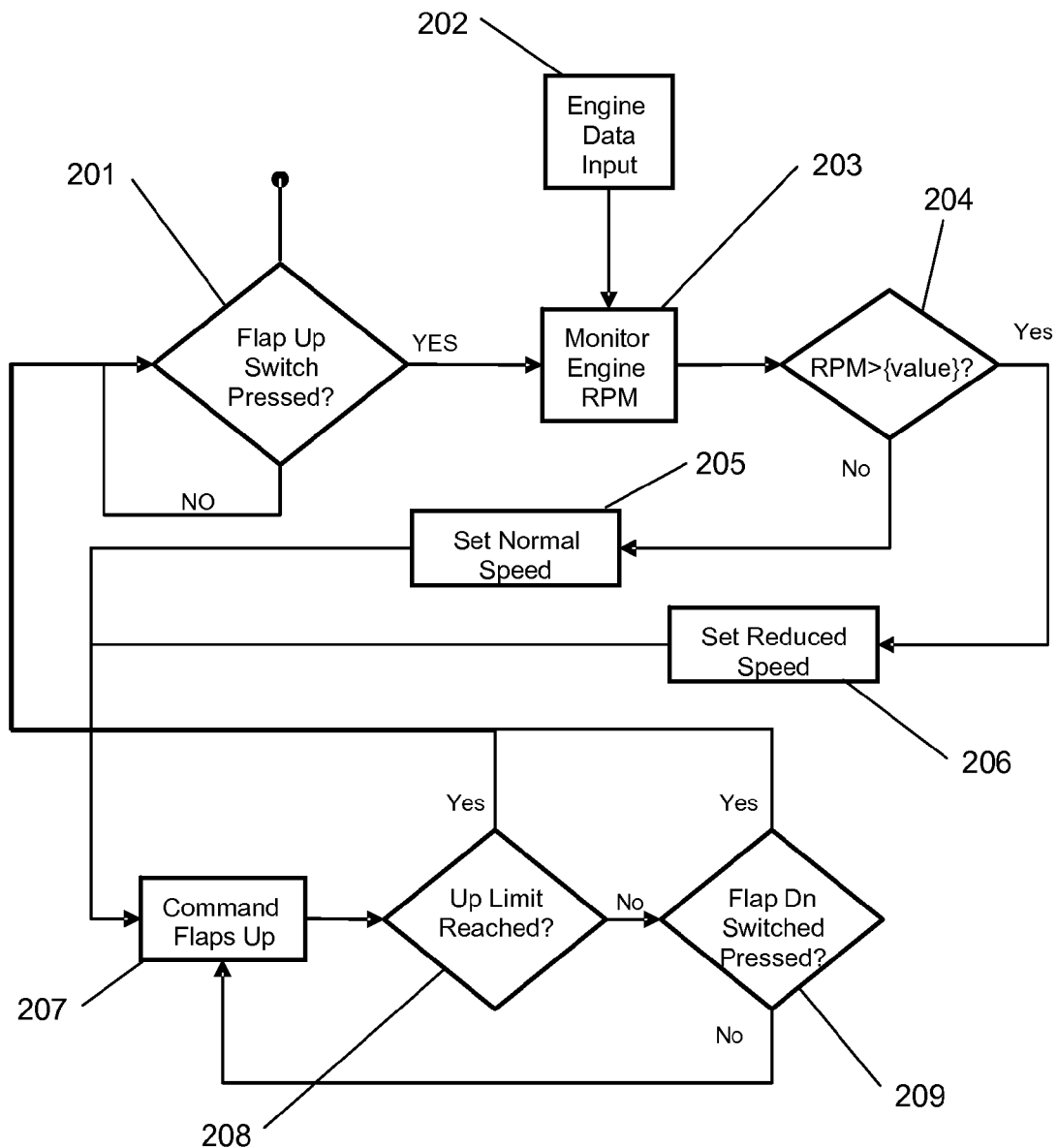
FIG. 2 is a schematic illustration of an example embodiment of the present invention.

FIG. 2 is a schematic illustration of an example embodiment of the invention responding to a "flaps up" direction from a pilot. The example embodiment becomes active when the flaps are commanded to move up 201, e.g., via a pilot-controlled switch. The pilot need only push the flap up switch momentarily to command upward flap movement. Sensors 202 report information that allows determination of the engine power applied 203 (e.g., whether the engine is at full power). Power level can be determined by comparing engine RPM (or in the case of turbine engines N1% or torque, ground speed, air speed, fuel supply rate, or a combination thereof) with a threshold 204. If the engine power is below the threshold, then the flap operation is set to normal speed 205 (where "speed" refers to the integrated motion vs. time of the flap movement, e.g., normal speed refers to a baseline motor speed and motor on/off cycle). If the engine power is above the threshold, then the flap operation is set to a reduced speed 206. The flap control motors are then energized to begin flap movement up 207, at the speed set previously 205, 206, until either the upper limit of flap position is reached 208, or the pilot gives a "flaps down" direction 209. The reduced flap speed can be accomplished in various ways. As an example, the voltage to the flap control motors can be reduced, the motor can be operated intermittently, or hydraulic pressure can be reduced (for hydraulically activated flaps).

Figure 3:
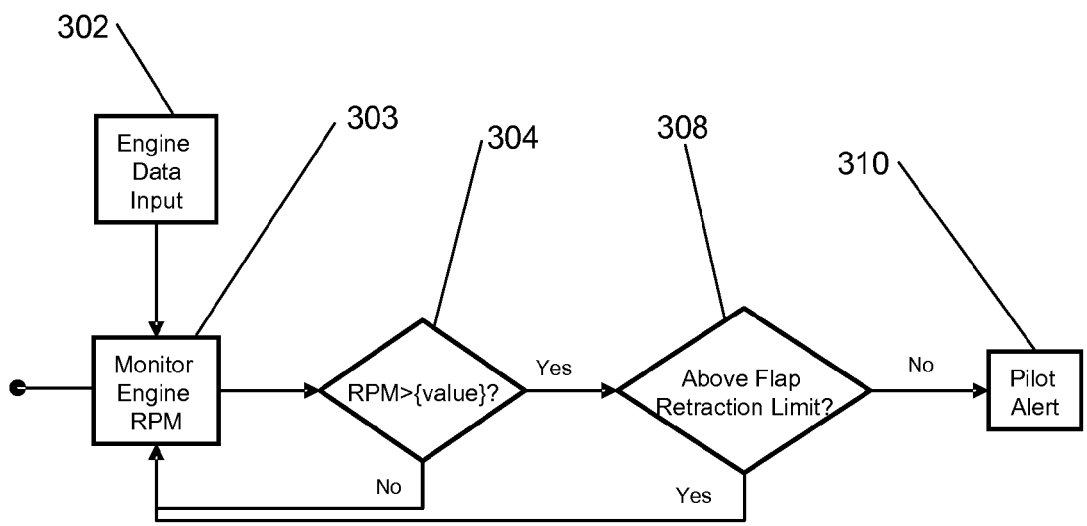
FIG. 3 is a schematic illustration of an example embodiment of the present invention.

FIG. 3 is a schematic illustration of an example embodiment of the present invention. The power output of the engine is sensed 302, for example by monitoring the engine RPM 303. If the power output exceeds a threshold 304, and the flaps are not above a retraction limit 308, then an alert is provided to a pilot 310. The retraction limit can be established to allow operation such as takeoff with slightly extended flaps, but still provide alerts if the flaps are left substantially extended during high power operation.

The particular sizes and equipment discussed above are cited merely to illustrate particular embodiments of the invention. It is contemplated that the use of the invention can involve components having different sizes and characteristics. It is intended that the scope of the invention be defined by the claims appended hereto.

We claim:

1. A method of controlling flap actuation in an aircraft with a controller, comprising:
   a) determining whether a signal to raise the flaps has been supplied, and, if so
   b) determining whether the aircraft engine is operating above a threshold power level, and, if so
   c) raising the flaps at a first rate, and, if not,
   d) raising the flaps at a second rate, greater than the first rate.

2. A method as in claim 1, wherein determining whether the aircraft engine is operating above a threshold power level comprises determining the aircraft engine RPM, the aircraft turbine N1%, the aircraft air speed, the aircraft ground speed, the aircraft fuel supply rate, or a combination thereof.

3. A method as in claim 1, wherein raising the flaps at a first rate comprises supplying a first voltage to an electrical flap actuator, and wherein raising the flaps at a second rate comprises supplying a second voltage to the electrical flap actuator, wherein the second voltage is greater than the first voltage.

4. A method as in claim 1, wherein raising the flaps at a first rate comprises raising the flaps for a first time duration, then hold the flaps substantially immovable for a second time duration, then raising the flaps for a third time duration.

5. A method as in claim 1, wherein raising the flaps at a first rate comprises supplying hydraulic fluid to a hydraulic flap actuator at a first pressure, and wherein raising the flaps at a second rate comprises supplying hydraulic fluid to the hydraulic flap actuator at a second pressure, wherein the second pressure is greater than the first pressure.

6. A method as in claim 1, further comprising detecting if the flaps are extended beyond a threshold amount, detecting whether the aircraft engine is operating above a threshold power level, and, if both conditions are detected, then communicating an alert to the pilot.

7. A method of communicating an aircraft status to a pilot with a controller, comprising detecting if the flaps are extended beyond a threshold amount, detecting whether the aircraft engine is operating above a threshold power level, and, if both conditions are detected, then communicating an alert to the pilot.

8. An apparatus for controlling flap actuation in an aircraft, comprising:
   a) a flap motor controller, configured to move the flaps responsive to control signals;
   b) a flap position sensor, configured adapted to produce a signal representative of the position of the flaps;
   c. an engine power sensor, configured to produce a signal representative of the engine power output;
   d. a controller, configured to accept a "flaps up" direction from a pilot, and responsive thereto to supply a control signal to the flap motor controller to raise the flaps at a first rate if the engine power signal indicates an engine power above a threshold and at a second rate, greater than the first rate, if the engine power signal indicates an engine power below the threshold; and to continue such control signal until the flap position sensor signal indicates that the flaps are in an up position or until the pilot supplies a direction to cease raising the flaps.

9. An apparatus as in claim 8, wherein the direction to cease raising the flaps comprises a "flaps down" signal.

10. An apparatus as in claim 8, wherein the engine power sensor is configured to produce a signal representative of engine RPM, turbine N1%, ground speed, air speed, fuel supply rate, or a combination thereof.

11. An apparatus as in claim 8, wherein the control signal comprises a voltage, and the voltage supplied for the first rate is lower than the voltage supplied for the second rate.

12. An apparatus as in claim 8, wherein the flap motor controller is hydraulic, and wherein the control signal comprises a hydraulic pressure signal that is lesser for the first rate than for the second rate.

13. An apparatus as in claim 8, wherein the control signal is cycled on and off for the first rate.

14. An apparatus as in claim 13, wherein the control signal is cycled on and off for the second rate, and wherein the ratio of on cycle to off cycle is greater for the first rate than the second rate.

* * * * *